United States Patent
Yuk et al.

(10) Patent No.: US 8,780,834 B2
(45) Date of Patent: Jul. 15, 2014

(54) CENTER FREQUENCY CONTROL METHOD IN WIRELESS ACCESS SYSTEM

(75) Inventors: Young Soo Yuk, Anyang-si (KR); Eun Jong Lee, Anyang-si (KR); Yong Ho Kim, Anyang-si (KR); Ki Seon Ryu, Anyang-si (KR); In Uk Jung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 298 days.

(21) Appl. No.: 13/264,984

(22) PCT Filed: Apr. 15, 2010

(86) PCT No.: PCT/KR2010/002354
§ 371 (c)(1),
(2), (4) Date: Jan. 9, 2012

(87) PCT Pub. No.: WO2010/120135
PCT Pub. Date: Oct. 21, 2010

(65) Prior Publication Data
US 2012/0099542 A1    Apr. 26, 2012

Related U.S. Application Data

(60) Provisional application No. 61/169,709, filed on Apr. 15, 2009, provisional application No. 61/173,217, filed on Apr. 28, 2009, provisional application No. 61/310,261, filed on Mar. 3, 2010, provisional application No. 61/314,553, filed on Mar. 16, 2010.

(51) Int. Cl.
*H04W 4/00* (2009.01)
*H04J 1/00* (2006.01)

(52) U.S. Cl.
USPC ............................ 370/329; 370/328; 370/343

(58) Field of Classification Search
None
See application file for complete search history.

(56) References Cited

U.S. PATENT DOCUMENTS

| | | | |
|---|---|---|---|
| 2004/0086027 A1* | 5/2004 | Shattil | 375/146 |
| 2005/0195910 A1* | 9/2005 | Kim et al. | 375/260 |
| 2005/0250450 A1* | 11/2005 | Olds | 455/42 |
| 2007/0105592 A1* | 5/2007 | Kang et al. | 455/561 |
| 2009/0154927 A1* | 6/2009 | Oksman | 398/76 |
| 2009/0202010 A1* | 8/2009 | Fu et al. | 375/260 |

FOREIGN PATENT DOCUMENTS

| KR | 1020060107514 | 10/2006 |
|---|---|---|
| KR | 1020060135871 | 12/2006 |
| KR | 1020080005821 | 1/2008 |

* cited by examiner

*Primary Examiner* — Marcus R Smith
*Assistant Examiner* — Lonnie Sweet
(74) *Attorney, Agent, or Firm* — Lee, Hong, Degerman, Kang & Waimey (57) ABSTRACT

The present invention relates to a method and an apparatus that supports a multi-carrier wireless access system for transmitting and receiving system information. The 1st embodiment of the present invention is a method for controlling a center frequency in a wireless access system comprising the steps of: receiving a control message including a 1st parameter which indicates a configuration of carrier groups and a 2nd parameter which indicates whether the center frequency is controlled from a base station; deriving the center frequency of carriers allocated to a mobile terminal by using the 1st parameter; and controlling the center frequency by using the 2nd parameter.

10 Claims, 7 Drawing Sheets

CENTER FREQUENCY CONTROL METHOD IN WIRELESS ACCESS SYSTEM

CROSS-REFERENCE TO RELATED APPLICATIONS

This application is the National Stage filing under 35 U.S.C. 371 of International Application No. PCT/KR2010/002354, filed on Apr. 15, 2010, which claims the benefit of U.S. Provisional Application Ser. Nos. 61/314,553, filed on Mar. 16, 2010, 61/310,261, filed on Mar. 3, 2010, 61/173,217, filed on Apr. 28, 2009, and 61/169,709, filed on Apr. 15, 2009.

TECHNICAL FIELD

The present invention relates to a wireless access system and particularly to a method and apparatus for transmitting and receiving system information in a wireless access system that supports multiple carriers.

BACKGROUND ART

Hereinafter, a carrier will be briefly described.

A user may carry information in a sine wave or a periodic pulse wave by performing a modulation operation with respect to the amplitude, frequency and/or phase. A sine wave or a pulse wave for carrying information is called a carrier.

Examples of a carrier modulation scheme include a Single-Carrier Modulation (SCM) scheme and a Multi-Carrier Modulation (MCM) scheme. Among others, the SCM scheme involves performing modulation with respect to all information carried on one carrier.

The MCM scheme is a technology of dividing an overall bandwidth channel of one carrier into several sub-channels each having a small bandwidth and transmitting a multiplexed plurality of narrowband sub-carriers through the sub-channels.

In the MCM scheme, each of the sub-channels is approximated to a flat channel due to the limited bandwidth. A user can compensate for channel distortion using a simple equalizer. In addition, the MCM scheme is implemented at a high speed using Fast Fourier Transform (FFT) and is more advantageous in high-speed data transmission than the SCM scheme.

As capabilities of a base station and/or a terminal have been developed, an available frequency bandwidth of the base station and/or the terminal has been expanded. Accordingly, the embodiments of the present invention disclose a multicarrier system that supports a wideband by aggregating one or more carriers, unlike the MCM scheme.

For example, to increase transmission capacity of wireless data, bandwidths of 200 KHz to 1.25 MHz are used in a 2nd generation wireless communication system and bandwidths of 5 MHz to 10 MHz are used in a 3rd generation wireless communication system. Extended bandwidths of up to 20 MHz are used in a 3GPP LTE system or an IEEE 802.16m system which are 4th generation wireless access systems that have been recently developed.

Although the method of increasing the bandwidth is essential to increase transmission efficiency of wireless data, increasing the bandwidth leads to high power consumption since a high bandwidth should be supported even when low-level services are required. There is also a problem in that the current systems cannot be reused for supporting such requirements.

To overcome such problems, studies have been conducted on a multicarrier transmission method for simultaneously transmitting and receiving a plurality of individual bandwidths.

DISCLOSURE

Technical Problem

An object of the present invention devised to solve the problem lies in a method for efficiently transmitting system information in a multicarrier system.

Another object of the present invention devised to solve the problem lies in a method for adjusting neighbor subcarriers in a system that supports carrier aggregation by combining two or more bandwidths.

Another object of the present invention devised to solve the problem lies in a new message structure for efficiently transmitting configuration information of carriers when supporting multiple carriers.

Objects of the present invention are not limited to those described above and other objects can be conceived by those having general knowledge in the art from the embodiments of the present invention that are described below.

Technical Solution

To achieve the above objects of the present invention, the present invention provides a method and apparatus for transmitting and receiving system information in a wireless access system that supports multiple carriers. The present invention also provides methods for adjusting a center frequency of each carrier in a multicarrier environment and apparatuses that support the methods.

As a first embodiment of the present invention, a method for adjusting a center frequency in a wireless access system may include receiving a control message including a first parameter, indicating a configuration of a carrier group, and a second parameter, indicating whether or not a center frequency has been adjusted, from a base station, obtaining a center frequency of a carrier allocated to a mobile station using the first parameter, and adjusting the center frequency of the carrier using the second parameter.

As a second embodiment of the present invention, a mobile station for adjusting a center frequency in a wireless access system may include a transmission module for transmitting a wireless signal, a reception module for receiving a wireless signal, and a processor for controlling adjustment of the center frequency. Here, the processor controls operations including receiving a control message including a first parameter, indicating a configuration of a carrier group, and a second parameter, indicating whether or not a center frequency has been adjusted, from a base station, obtaining a center frequency of a carrier allocated to the mobile station using the first parameter, and adjusting the center frequency of the carrier using the second parameter.

In the first and second embodiments, the first parameter may be a multicarrier configuration index indicating at least one of a total bandwidth of the carrier group, the number of component carriers included in the carrier group, and the order of allocation of the component carriers.

The second parameter may be a center frequency shift parameter indicating whether or not the center frequency is to be shifted from a channel raster grid or a reference carrier indicator indicating whether or not the allocated carrier is a reference carrier.

The control message may further include a physical carrier index indicating an index of each physical carrier of the carrier group. Here, the center frequency may be obtained using the first parameter and the physical carrier index. The control message may be a global carrier configuration message or a neighbor base station advertisement message.

The first and second embodiments are some of a variety of preferred embodiments of the present invention and other embodiments employing the technical features of the present invention may be derived and understood by those having general knowledge in the art from the following detailed description of the present invention.

That is, the following detailed description not only may support the first and second embodiments but may also represent new embodiments that are derived from the first and second embodiments or are implemented by combining steps of the first and second embodiments.

Advantageous Effects

The embodiments of the present invention have the following advantages.

First, it is possible to efficiently transmit and receive system information in a multicarrier system.

Second, it is possible to correctly and efficiently adjust neighbor subcarriers in a system that supports carrier aggregation that combines one or more bandwidths.

Third, it is possible to efficiently transmit and receive configuration information of carriers in a multicarrier environment by using a new message structure suggested in the present invention.

Advantages of the present invention are not limited to those described above and other advantages will be clearly derived and understood by those having general knowledge in the art from the following description of the embodiments of the present invention. That is, advantages that are unintended by the present invention will also be able to be derived from the embodiments of the present invention by those having general knowledge in the art.

BEST MODE

The present invention will disclose a variety of methods and apparatuses for transmitting and receiving system information in a wireless access system that supports multiple carriers.

The embodiments described below are provided by combining components and features of the present invention in specific forms. The components or features of the present invention should be considered optional unless explicitly stated otherwise. The components or features may be implemented without being combined with other components or features. The embodiments of the present invention may also be provided by combining some of the components and/or features. The order of the operations described above in the embodiments of the present invention may be changed. Some components or features of one embodiment may be included in another embodiment or may be replaced with corresponding components or features of another embodiment.

In the following description made in conjunction with the drawings, procedures or steps that may obscure the subject matter of the present invention are not described and procedures or steps that will be apparent to those skilled in the art are also not described.

The embodiments of the present invention have been described focusing mainly on the data communication relationship between a Mobile Station (MS) and a Base Station (BS). The BS is a terminal node in a network which performs communication directly with the MS. Specific operations which have been described as being performed by the BS may also be performed by an upper node above the BS as needed.

That is, it will be apparent to those skilled in the art that the BS or any other network node may perform various operations for communication with MSs in a network including a number of network nodes including BSs. The term "base station (BS)" may be replaced with another term such as "fixed station", "Node B", "eNode B (eNB)", "Advanced BS (ABS)", or "access point".

The term "MS" may also be replaced with another term such as "User Equipment (UE)", Subscriber Station (SS), "Mobile Subscriber Station (MSS)", mobile terminal, "Advanced Mobile Station (AMS)", or terminal.

In addition, the term "transmitting end" or "transmitting side" refers to a fixed and/or mobile node that provides a data service or an audio service and the term "receiving end" or "receiving side" refers to a fixed and/or mobile node that receives a data service or an audio service. Thus, in uplink, the MS may serve as a transmitting end and the BS may serve as a receiving end. Similarly, in downlink, the MS may serve as a receiving end and the BS may serve as a transmitting end.

The embodiments of the present invention can be supported by standard documents of at least one of the IEEE 802 system, the 3GPP system, the 3GPP LTE system, and the 3GPP2 system which are wireless access systems. That is, obvious steps or portions that are not described in the embodiments of the present invention can be supported by the standard documents.

For all terms used in this disclosure, reference can be made to the standard documents. Especially, the embodiments of the present invention can be supported by at least one of P802.16e-2004, P802.16e-2005, P802.16Rev2, and P802.16m which are standard documents of the IEEE 802.16 system.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

Specific terms used in the embodiments of the present invention are provided for better understanding of the present invention and can be replaced with other terms without departing from the spirit of the present invention.

Multicarrier General

In the multi-carrier system described below, one or more individual carriers are aggregated and used as a carrier aggregation, unlike the MCM scheme in which one carrier is divided into sub-carriers and utilizing the sub-carriers.

FIGS. 1(a) and 1(b) are diagrams illustrating a method of transmitting or receiving a signal based on a multi-band radio frequency (RF).

In order to efficiently utilize multiple bands or multiple carriers, a technique of managing several carriers (i.e., a frequency allocation (FA)) by one medium access control (MAC) entity has been proposed.

Figure 1:
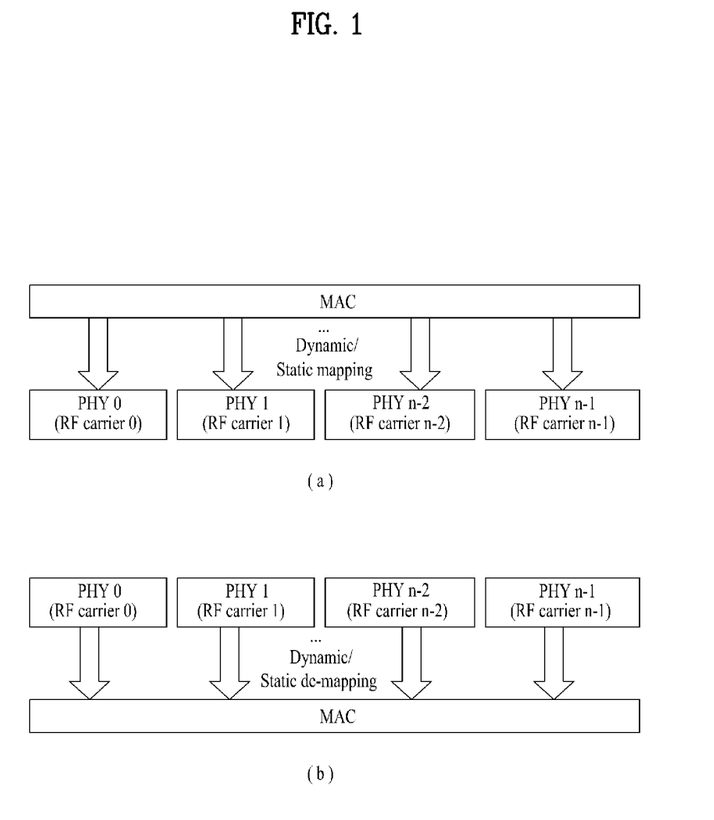
FIGS. 1(a) and 1(b) illustrate a method for transmitting or receiving a signal based on a multi-band radio frequency (RF).

In FIG. 1, in a transmitter and a receiver, one MAC layer may manage several carriers in order to efficiently use multiple carriers. In order to efficiently transmit or receiver multiple carriers, it is assumed that both the transmitter and the receiver can transmit or receive multiple carriers. Since the frequency carriers (FCs) managed by one MAC layer do not need to be contiguous with each other, flexible resource management is possible. That is, the MAC entity can support both contiguous aggregation and non-contiguous aggregation.

In FIGS. 1(a) and 1(b), PHY 0, PHY 1, . . . , PHY n−2, and PHY n−1 represent multiple bands of the present technology, each of which may have a Frequency Allocation (FA) size assigned for a specific service according to a predetermined frequency policy. For example, the band PHY 0 (RF carrier 0) may have a frequency band size assigned for a general FM radio broadcast and the band PHY 1 (RF carrier 1) may have a frequency band size assigned for mobile telephone communication.

The frequency bands may have different frequency band sizes according to frequency band characteristics. However, in the following description, for convenience of description, it is assumed that each FA has a size of A [MHz].

Each FA may be represented by a carrier frequency for using a baseband signal in each frequency band. Hereinafter, each FA is referred to as "carrier frequency band" or is simply referred to as a "carrier" which is representative of each carrier frequency band if such use will not lead to confusion. As, as in the 3GPP LTE-A, the carrier may be referred to as a "component carrier" in order to be distinguished from a sub-carrier used in the MCM scheme.

Therefore, the above "multi-band" scheme may be referred to as a "multi-carrier" scheme or a "carrier aggregation" scheme.

In order to transmit a signal through multiple bands as shown in FIG. 1(a) and receive a signal through multiple bands as shown in FIG. 1(b), the transmitter/receiver needs to include an RF module for transmitting the signal through the multiple bands. In FIG. 1, the method of configuring "MAC" is determined by a base station regardless of downlink (DL) and uplink (UL).

In brief, the present technology is a technology for enabling one MAC entity (which will be simply referred to as a "MAC" if such use does not lead to confusion) to manage and operate a plurality of RF carriers, thereby transmitting/receiving a signal.

In an IEEE 802.16m system which is a wireless communication system, carriers may be mainly classified into two types from the viewpoint of a BS. For example, carriers may be divided into a Fully Configured Carrier (FCC) type and a Partially Configured Carrier (PCC) type.

The FCC type represents carriers which can transmit and receive all control information and data and the PCC type represents carriers which can transmit and receive only DL data. Here, the PCC may be used to provide an Enhanced Multicast Broadcast Service (E-MBS) that mainly provides DL data.

Carriers allocated to an MS may be classified into two carrier types from the viewpoint of the MS. For example, carriers may be divided into a primary carrier and secondary carriers. Here, the BS may allocate one primary carrier and a plurality of secondary carriers to the MS.

The primary carrier is selected from fully configured carriers and most main control information elements of the MS are transmitted in the primary carrier. The secondary carriers may be selected from the fully configured carriers or partially configured carriers and additional secondary carriers may be allocated at the request or instruction of the MS or BS.

The MS may transmit and receive all types of control information including control information of secondary carriers through the primary carrier and may transmit and receive data to and from the BS through the secondary carriers. Here, a secondary carrier which is a fully configured carrier allocated to a specific MS may be set as a primary carrier of another MS.

In addition, the number of carriers used in downlink and the number of carriers used in uplink may be different in embodiments of the present invention. That is, carriers that are actually used may be configured such that the numbers and types of the carriers vary depending on the characteristics of multiple carriers supported by the BS and the MS. In addition, carriers may also be configured such that the usage of the carriers varies depending on Quality of Service (QoS) of the MS or load condition of the BS.

Multiple carriers may be classified into an available carrier set and an assigned carrier set according to the usage. The available carrier set is a set of all carriers that are present in the BS and the assigned carrier set is a set of carriers that are actually assigned to the MS. Here, the assigned carrier set may be all or part of the available carrier set.

The BS may transmit information regarding the available carrier set to the MS through a specific broadcast channel. The multicarrier information may be transmitted through a neighbor BS advertisement (AAI_NBR-ADV) message since the multicarrier information is similar to co-located Frequency Assignment (FA) information that is transmitted for inter-frequency handover in a legacy system (e.g., IEEE 802.16e). The multicarrier information may also be transmitted through an additional message that carries multicarrier configuration information.

The MS may receive multicarrier information from the BS upon initial network entry. In the case in which the MS has not received multicarrier information during initial entry, the MS may continue to use a currently used carrier.

To support multicarrier transmission, the MS and the BS exchange parameters associated with multicarrier capabilities. This procedure is generally performed during a network entry procedure or during a similar procedure (e.g., a registration procedure, an initial ranging procedure, or a basic capability negotiation procedure).

The BS allocates a primary carrier and secondary carriers to the MS according to the multicarrier capability parameters, which have been exchanged with the MS, and a current load condition of the BS. Although the primary carrier is a carrier used to perform network entry, the BS may allocate another fully configured carrier as a primary carrier for distribution of the primary carrier.

In this manner, the BS defines carriers allocated to a specific MS as assigned carriers and maintains the assigned carrier set until the assigned carriers are updated for some reason. Although the assigned carrier set is allocated to the MS, all carriers allocated to the MS are not necessarily always used. That is, all or part of the assigned carrier set is used for actual data transmission and carriers used for actual data transmission are referred to as active carriers. Here, the primary carrier always operates as an active carrier and each of the secondary carriers may operate as an active or inactive carrier according to an instruction from the BS.

The assigned carriers are assigned in association with radio frequency capability of the MS and the BS and the usage of each active carrier is determined according to the current service requirement of the MS. Inactive carriers may be turned off for power saving, which can reduce network overhead since there is no need to transmit a control channel associated with carriers that have been turned off.

Figure 2:
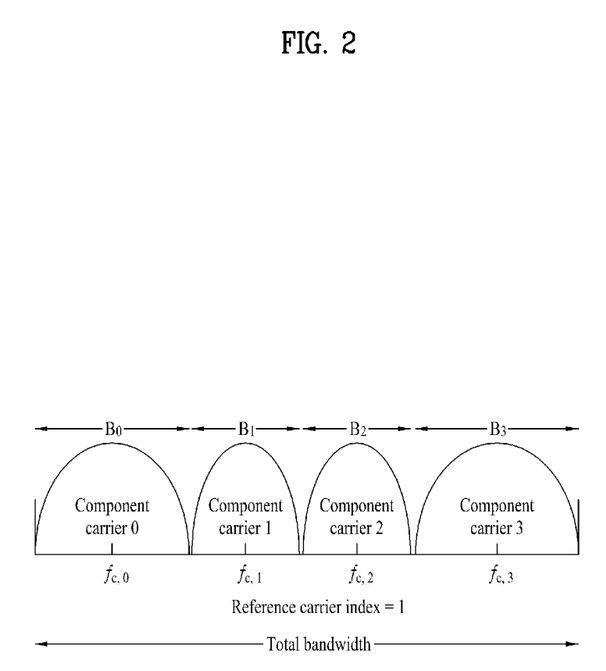
FIG. 2 illustrates an example of a carrier aggregation that is used in the embodiments of the present invention.

FIG. 2 illustrates an example of a carrier aggregation that is used in the embodiments of the present invention.

As shown in FIG. 2, a total bandwidth includes four component carriers. Here, the center frequency of component carrier 0 is $f_{c,0}$, the center frequency of component carrier 1 is $f_{c,1}$, the center frequency of component carrier 2 is $f_{c,2}$, and the center frequency of component carrier 3 is $f_{c,3}$. Here, a reference carrier index may be set to 1 since the reference carrier is the component carrier 1.

Figure 3:
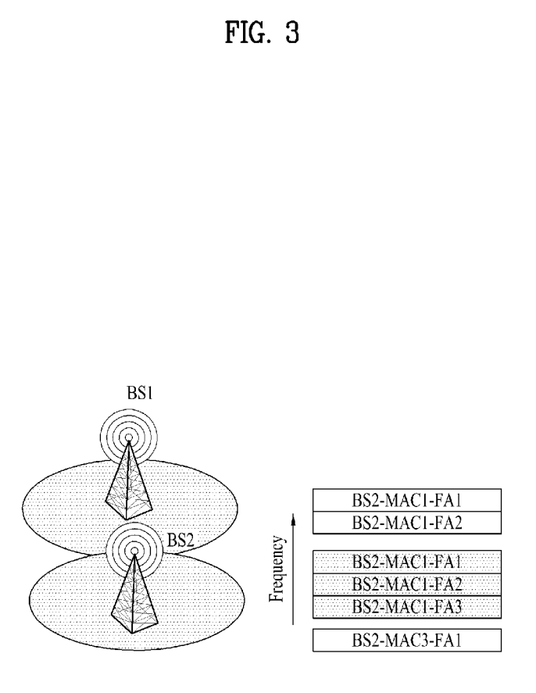
FIG. 3 illustrates a 3-step allocation structure of carrier aggregation in a system that supports carrier aggregation (CA) according to an embodiment of the present invention.

FIG. 3 illustrates a 3-step allocation structure of carrier aggregation in a system that supports carrier aggregation (CA) according to an embodiment of the present invention.

As shown in FIG. 3, 3 entities (or objects) may be defined in a BS that supports carrier aggregation. The 3 entities are a BS entity, a Medium Access Control (MAC) entity, and a Frequency Allocation or Frequency Assignment (FA) entity.

The BS entity may include one or more MAC entities and one BS entity preferably includes one MAC entity. That is, the BS entity may manage one or more FAs.

The MAC entity may be defined as a collection of carriers (i.e., FAs) having the same MAC identifier. That is, one MAC entity may control one or more FAs.

The FA entity may be used as the same meaning as a component carrier and indicates one carrier band which operates independently. One FA entity has a single bandwidth that is defined in each wireless access system. For example, FA entities having bandwidths of 5, 7.5, 8.75, 10, and 20 MHz may be present in an IEEE 802.16m system and FA entities having bandwidths of 1.25, 5, 10, and 20 MHz may be present in an LTE system. In an IEEE 802.16e system, the FA may be used as the same meaning as the bandwidth of a channel programmed in the corresponding BS and a logical allocation (or assignment) of the center frequency of downlink.

As shown in FIG. 3, the second BS (BS2) may include 1st to 3rd MAC entities depending on the frequency band. The second BS (BS2) can currently control 1st to 3rd FAs (FA1~FA2) using the 2nd MAC entity (MAC 2).

Figure 4:
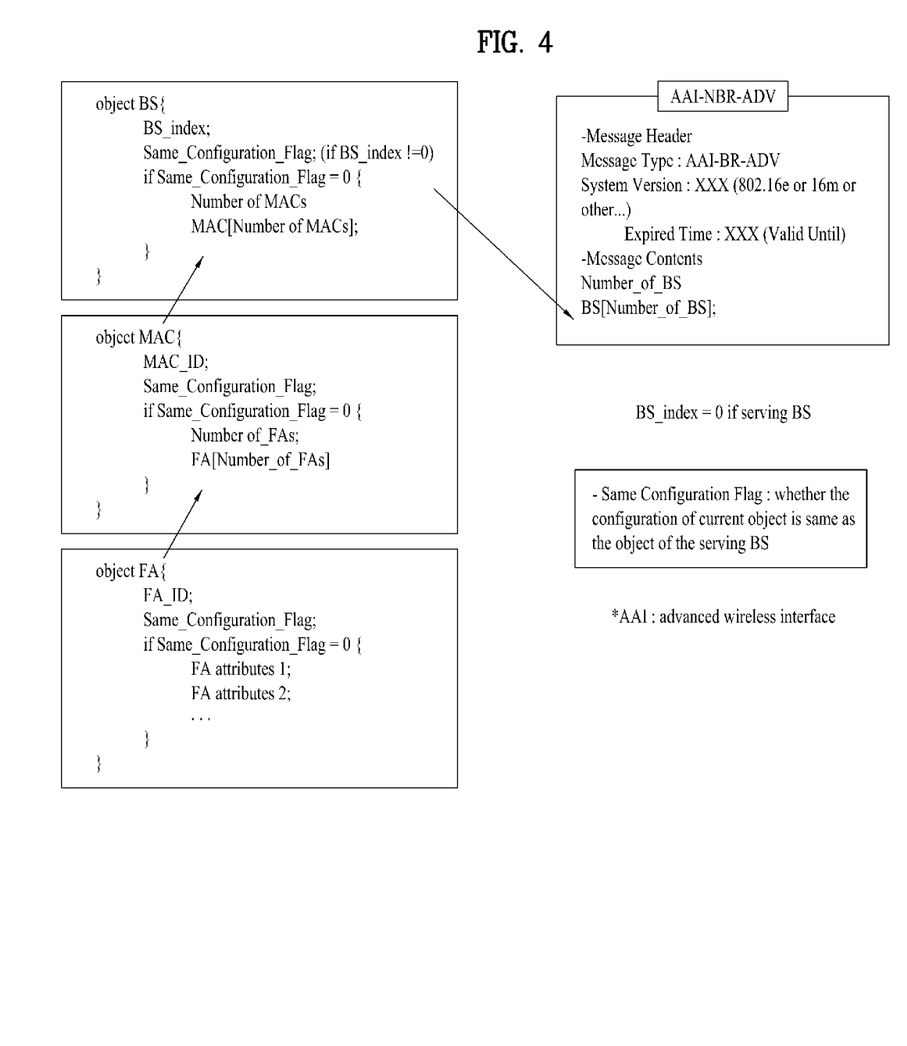
FIG. 4 illustrates one method for configuring a neighbor BS advertisement message according to an embodiment of the present invention.

FIG. 4 illustrates one method for configuring a neighbor BS advertisement message according to an embodiment of the present invention.

As shown in FIG. 4, the neighbor BS advertisement (AAI_NBR-ADV) message includes information regarding neighbor BSs and the number of neighbor BSs. Here, the information regarding the neighbor BSs may include the number of MAC entities included in each neighbor BS and information regarding each MAC entity. The information regarding each MAC entity may include information regarding the number of FAs that are managed by the corresponding MAC entity and attribute information of each FAs.

That is, the BS may incorporate individual information of each FA into the neighbor BS advertisement message while incorporating common information of BS entities (or MAC entities) into the neighbor BS advertisement message only once, thereby increasing message transmission efficiency.

In the case in which information of a specific BS entity is identical to that of a serving BS, in the case in which information of a specific MAC entity is identical to that of the corresponding MAC entity, or in the case in which information of a specific FA entity is identical to that of the corresponding FA entity, it is possible to omit the information of the specific BS entity, the information of the specific MAC entity, or the information of the specific FA entity using a same configuration flag (Same_Configuration_Flag).

The attribute information of FAs may include a multicarrier support capability parameter, a Multicarrier Configuration Index (MCI), frequency shift information, availability for guard resources, and carrier type information.

Here, the multicarrier support capability parameter indicates whether or not the corresponding carrier supports a multicarrier operation and the MCI indicates the type of multicarrier configuration. That is, using the MCI, the BS may indicate a reference frequency or a reference FA of all multiple carriers.

In addition, the frequency shift information may indicate whether or not the center frequency of the corresponding FA has been adjusted to frequency raster. That is, using the frequency shift information, the MS may adjust the frequency of each component carrier so as to maintain the same subcarrier spacing as the center frequency of the corresponding FA.

The guard resource availability information indicates whether or not it is possible to use guard resources (for example, Physical Resource Units (PRU)) and the number of guard resources that can be used at both edges. In addition, the carrier type information indicates whether the corresponding carrier is an FCC or a PCC.

The MS can acquire configuration information of each carrier using the MCI. The following Table 1 indicates an example of an MCI format that can be used in the embodiments of the present invention.

TABLE 1

| MCI | Total bandwidth | Number of component carriers | Order of component carriers (0: 5 MHz, 1: 10 MHz, 2: 20 MHz, 3: others) |
|---|---|---|---|
| 0 | 5 MHz | 1 | 0 |
| 1 | 10 MHz | 1 | 1 |
| 2 | 10 MHz | 2 | 00 |
| 3 | 20 MHz | 1 | 2 |
| 4 | 20 MHz | 2 | 11 |
| 5 | 20 MHz | 4 | 0000 |
| 6 | 20 MHz | 3 | 112 |
| 7 | 40 MHz | 3 | 121 |
| 8 | 40 MHz | 2 | 22 |
| ... | ... | | |
| N | 80 MHz | 4 | 1111 |
| ... | ~100 MHz | | ... |

In Table 1, an MCI indicates configuration information of a carrier group that can be transmitted through one IFFT. MCIs may indicate respective component carriers of allocated carrier groups in increasing order of frequency in association with the MCIs. Specifically, each MCI indicates the total bandwidth of the MCI, the number of allocated component carriers, and the bandwidths of the component carriers.

The MS may determine whether or not to adjust the center frequency based on the center frequency shift information included in the FA attribute information. If the center frequency of the FA allocated to the MS is identical to the reference carrier, the MS does not adjust the center frequency of the FA.

Here, a component carrier located at a frequency raster grid may be referred to as a reference carrier. The MS does not need to adjust the frequency when the FA allocated to the MS is the reference carrier. However, it is preferable that the MS adjust the center frequency according to the frequency shift information when the FA allocated to the MS is not the reference carrier.

Figure 5:
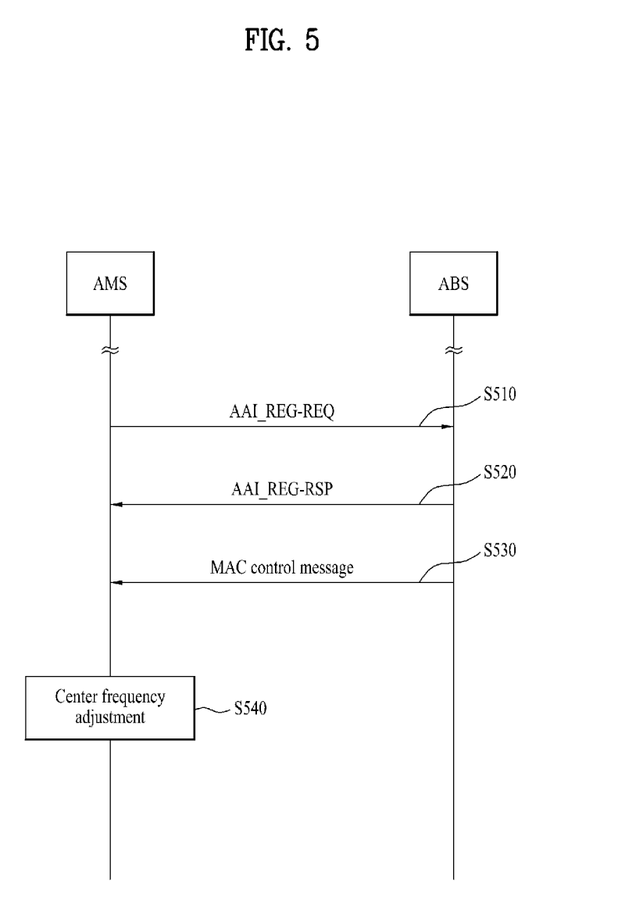
FIG. 5 illustrates one method for transmitting system information of a BS according to another embodiment of the present invention.

FIG. 5 illustrates one method for transmitting system information of a BS according to another embodiment of the present invention.

As shown in FIG. 5, to perform initial network entry, an AMS transmits and receives ranging messages AAI_RNG-REQ/RSP to and from an ABS to perform an initial ranging procedure (not shown).

The AMS may exchange basic MC capability information with the ABS while performing a registration procedure with the ABS. That is, the AMS may transmit a registration request (AAI_REG-REQ) message including information regarding basic multicarrier capabilities supported by the AMS to the ABS (S510).

In step S510, the AMS may transmit only a multicarrier (MC) mode, which is supported by the AMS, as the simplest form of basic MC capability information to the ABS. The following Table 2 illustrates an example of basic MC capability information which includes only the MC mode.

TABLE 2

| b1, b2 | Multicarrier Capabilities |
|---|---|
| 00 | No MC Modes |
| 01 | Basic MC mode |
| 10 | Multicarrier Aggregation |
| 11 | Multicarrier Switching |

As shown in Table 2, the MC mode may be expressed as a 2-bit code. The 2-bit code indicates a single carrier mode in which the AMS does not support the MC mode when the 2-bit code is set to '00', indicates that the AMS supports the basic MC mode when the 2-bit code is set to '01', indicates that the AMS supports carrier aggregation (frequency, MC aggregation) when the 2-bit code is set to '10', and indicates that the AMS supports MC switching when the 2-bit code is set to '11'.

Here, in the basic MC mode, the AMS supports primary carrier change as an MC operation and an optimized carrier scanning operation included in MC operations.

Referring back to FIG. 5, the ABS may transmit a registration response (AAI_REG-RSP) message, which includes basic MC capability information indicating basic MC capabilities that can be supported by the ABS, to the AMS (S520).

In the case in which the ABS has received an AAI_REG-REQ message including the basic MC capability information having the form of Table 2 in step S520, it is preferable that the basic MC capability information of step S520 include only MC modes that can be supported by the ABS. Thus, the basic MC capability information may have the same format as that of Table 2 and include information indicating MC modes that can be supported by the ABS.

The AMS has negotiated with the ABS for a supportable multicarrier mode through steps S510 and S520. Here, in the example of FIG. 5, it is assumed that the AMS and the ABS support multicarrier. Accordingly, the ABS may transmit system information regarding supportable multiple carriers to the AMS through a MAC control message (S530).

In step S530, the multicarrier-related system information transmitted in step S530 may include a Multicarrier Configuration Index (MCI) of carriers that are supported by the ABS and a parameter (e.g., center frequency shift) indicating whether or not center frequency shift is to be performed. Here, the parameter indicating whether or not center frequency shift is to be performed may be used as a reference carrier indicator that indicates whether or not an FA (i.e., a carrier) allocated to the AMS is a reference carrier.

One of a global carrier configuration (AAI_Global-Config) message, a neighbor BS advertisement (AAI_NBR-ADV) message, and a multicarrier advertisement (AAI_MC-ADV) message may be used as the MAC control message in step S530 of FIG. 5.

The following Table 3 illustrates an example of the format of a global carrier configuration (AAI_Global-Config) message that can be used in step S530.

| Field | Size (bits) | Notes |
|---|---|---|
| MAC Control Message Type | 8 | |
| Number of Carrier Groups | 4 | Includes only DL carrier groups when they are carrier groups FDD of neighbor carriers |
| For(i=0; i<Number of Carrier Groups; i++){ | | |
| Duplexing Mode | 1 | 0: TDD1: FDD |
| Multicarrier Configuration Index (MCI) across the network | 6 | |
| Start Frequency Assignment Index | 14 | Frequency assignment index of first carrier of ith carrier group |
| Number of Carriers | 6 | |
| For(j=0; j<Number of Carriers; j++){ | | |
| Physical Carrier Index | 6 | Index of Physical carrier |
| Center Frequency Shift | 1 | Indicates whether or not the center frequency of corresponding carrier has shifted. 0b0: Not shifted from channel raster grid 0b1 : Shifted from channel raster grid |
| } | | |
| } | | |

As shown in FIG. 3, the global carrier configuration message may include the MAC control message type field which indicates the type of the corresponding message and the Number of Carrier Groups field which indicates the number of carrier groups of neighbor carriers.

Here, the global carrier configuration message may further include, for each carrier group, a duplexing mode field which indicates a duplexing mode of the carrier group, a multicarrier configuration index (MCI) field which indicates the multicarrier configuration of the carrier group, a start frequency assignment index field which indicates the frequency assignment index of the first carrier of the carrier group, and the Number of Carriers field which indicates the number of carriers of the carrier group.

In the case in which a plurality of carrier groups is present in the ABS, configuration information of each carrier group may be represented using the MCI field. For the configuration of the MCI field in Table 3, reference can be made to Table 2.

The global carrier configuration message may further include a physical carrier index field which indicates a physical carrier index of each carrier and a center frequency shift field which indicates whether or not the center frequency of the corresponding carrier has shifted from the channel raster grid.

Here, the center frequency shift field, which indicates whether or not the center frequency of the corresponding carrier has shifted, may be used as the same meaning as a reference carrier indicator which indicates whether or not the corresponding carrier is a reference carrier. This is because the center frequency of the reference carrier of each carrier group is always located on the channel raster grid such that frequency adjustment is not needed if the carrier is a reference carrier and frequency adjustment is needed if the carrier is not a reference carrier.

The following Table 4 illustrates an example of the format of a neighbor BS advertisement message that can be used as a MAC control message in step S530.

TABLE 4

| Syntax | Size (bits) | Notes |
|---|---|---|
| AAI_NBR-ADV_Message_format( ){ | | |
| Management Message Type = x | 8 | |
| N_NBR_BS | 8 | Number of neighbor BSs included in this message |
| For(j=0: j<N_NBR_BS; j++){ | | |
| BS_ID (or MAC_ID) | 8 | BS identifier (or MAC ID) of neighbor BS |
| Number of Carrier Groups (CG) | 8 | Total number of carrier groups |
| For(i=0; i<N_Carrier Group in this BS; i++){ | | |
| Duplexing Mode | 1 | Duplexing mode of carrier group: 0b0: FDD 0b1: TDD |
| Multicarrier Configuration Index | 6 | |
| Center frequency of the lowest component carrier | TBD | Indicates the center frequency of a start carrier of the combined carriers |
| For(j=0; i<N_FAs in this CG; j++){ | | |
| Carrier Type | 1 | 0b0: Fully Configured Carrier (FCC) 0b1: Partially Configured Carrier (PCC) |
| SA_Preamble index | 8 | SA preamble index of corresponding FA |
| Center Frequency Shift | 1 | Indicates whether or not center frequency of corresponding FA has shifted: 0b0: Not shifted from channel raster grid 0b1: shifted from channel raster grid |
| Capability on Guard PRU usage | 1 | |
| System information for this FA | TBD | System information (attribute information) of corresponding FA |
| } | | |
| } | | |
| } | | |

As shown in Table 4, the AAI_NBR-ADV message may include a Number of Neighbor BSs (N_NBR_BS) parameter indicating the number of neighbor BSs. The AAI_NBR-ADV message may further include, for the number of neighbor BSs, a parameter indicating an identifier (or a MAC identifier) of the neighbor BS and a parameter indicating the total number of Carrier Groups (CGs) of the neighbor BS.

Here, the AAI_NBR-ADV message may further include, for each of the carrier groups, a duplexing mode parameter indicating a duplexing mode of the carrier group, a Multicarrier Configuration Index (MCI) indicating the multicarrier configuration of the carrier group, and a parameter indicating the center frequency of the lowest component carrier of the carrier group.

The AAI_NBR-ADV message may also include parameters associated with FAs of the carrier group. For example, the AAI_NBR-ADV message may further include, for each FA, a carrier type parameter indicating the type of the FA, an SA preamble index of the FA, a center frequency shift parameter indicating whether or not the center frequency of the corresponding carrier has shifted, a parameter indicating whether or not guard resources are being used, and system information of the FA.

In Table 4, the center frequency shift parameter indicates whether or not the center frequency of a carrier allocated to the MS has shifted from the channel raster grid. That is, the center frequency shift parameter indicates whether or not the center frequency of the carrier has been adjusted.

Reference can be made to Table 4 for the sizes and functions of the parameters included in the NBR-ADV message. That is, only attribute information of each FA may be transmitted while expressing common information of an MBS in Table 4 only once, thereby increasing transmission efficiency of system information. Here, since the same duplexing mode is used in the same carrier group, the duplexing mode parameter of Table 3 may also be expressed only once.

The following Table 5 illustrates an example of the format of a neighbor BS advertisement message that can be used as a MAC control message in step S530.

TABLE 5

| Syntax | Size (bits) | Notes |
|---|---|---|
| AAI_NBR-ADV_Message_format( ){ | | |
| Management Message Type = x | 8 | |
| N_NBR_BS | 8 | Number of neighbor BSs included in this message |
| For(j=0: j<N_NBR_BS; j++){ | | |
| BS_ID (or MAC_ID) | 8 | BS identifier (or MAC ID) of neighbor BS |
| Number of Carrier Groups (CG) | 8 | Total number of carrier groups |
| For(i=0; i<N_Carrier Group in this BS; i++){ | | |
| Duplexing Mode | 1 | Duplexing mode of carrier group: 0b0: FDD 0b1: TDD |
| Multicarrier Configuration Index | 6 | |
| Center frequency of the lowest component carrier | TBD | Indicates the center frequency of a start carrier of the combined carriers |
| For(j=0; i<N_FAs in this CG; j++){ | | |
| Carrier Type | 1 | 0b0: Fully Configured Carrier (FCC) 0b1: Partially Configured Carrier (PCC) |
| SA_Preamble index | 8 | SA preamble index of corresponding FA |
| Center Frequency Shift | 3 | A center frequency shift value of the current carrier. A positive value indicates shift to a lower frequency and a negative value indicates shift to a higher frequency. {0; 1.5625; 3.125; 4.6875; −1.5625; −3.125; −4.6875} kHz |
| Capability on Guard PRU usage | 1 | |
| System information for this FA | TBD | System information (attribute information) of corresponding FA |
| } | | |
| } | | |
| } | | |

For details of parameters or fields described in Table 5, reference can be made to the description of Table 4 since the parameters or fields of Table 5 are similar to those of Table 4.

The only difference from Table 4 is a center frequency shift field which indicates whether or not the frequency of each carrier has been adjusted.

Referring to Table 5, the center frequency shift field has a size of 3 bits and represents a shift value of the center frequency of the current carrier as a constant value. In the case of an IEEE 802.16m system, the interval between each subcarrier (i.e., subcarrier spacing) is 10.9375 kHz and the channel raster is 200 kHz or 250 kHz.

Here, the difference between the center frequencies of two component carriers (i.e., FAs) is set to a multiple of the channel raster and it is assumed that the remainder of every possible multiple of the channel raster by the subcarrier spacing is the center frequency. In this case, the possible center frequency shift value may be limited to a specific set of values. That is, the possible center frequency shift value may be limited to a total of 7 values {0 Hz, 1.5625 kHz, 3.125 kHz, 4.6875 kHz, 6.25 kHz, 7.8125 kHz, 9.375 kHz}.

In addition, when the center frequency shift value is greater than a half of 10.9375 kHz, in order to adjust the center frequency shift value to a small value such that the center frequency shift value can be ignorable by a single carrier MS, the center frequency is shifted in the opposite direction (i.e., it is subtracted by 10.9375 kHz) such that possible center frequency shift values may be determined to be 0 Hz, ±1.5625 kHz, ±3.125 kHz, and ±4.6875 kHz.

In the embodiments of the present invention, when a plurality of carrier groups is present in one BS, configuration information of each carrier group may be represented using an MCI. However, the MCI field used in Tables 3 to 5 has a limitation in that it cannot represent various cases. Accordingly, the MCI field described in Tables 3 to Table 5 may be replaced with an MCI information element described in the following Table 6.

TABLE 6

| Syntax | Size (bits) | Notes |
| --- | --- | --- |
| Number of component carriers (Nc) | 4 | The number of component carriers included in corresponding carrier group: Value + 1 carrier(s) |
| If(Nc==0){ | | Indicates whether or not only one carrier is included in corresponding carrier group |
| BW | 2 | Bandwidth of component carrier: 0b00: 5 MHz 0b01: 10 Mhz 0b10: 20 Mhz 0b11: others (7 MHz or 8.75 MHz) Here, 7 MHz and 8.75 MHz must not be present in the same carrier group |
| }else | | Indicates MC of corresponding group |
| Reference Carrier Index | Variable | Index of a reference carrier adjusted to frequency raster. This value may be omitted if the center frequency shift parameter is used. |
| Configuration Type | 1 | 0b0: Combination of the same type of BWs (including the same sizes of BWs) 0b1: Combination of different types of BWs (including different sizes of BWs) |
| If(Configuration Type==0){ | | |
| Bw | 2 | Bandwidth of corresponding component carrier: 0b00: 5 MHz 0b01: 10 Mhz 0b10: 20 Mhz 0b11: others (7 MHz or 8.75 MHz) |
| }else{ | | |
| Configuration Bitmap | Variable (2 bits per carrier) | Bitmap of each component carrier: 0b00: 5 MHz 0b01: 10 Mhz 0b10: 20 Mhz 0b11: others (7 MHz or 8.75 MHz) |
| } | | |
| } | | |

In Table 6, an MCI IE may include a Number of component carriers (Nc) field indicating the number of component carriers included in each carrier group. Here, when the Nc field indicates that only one carrier is included in a corresponding carrier group, the MCI IE may further include a bandwidth field indicating the bandwidth of the component carrier. In addition, when the Nc field indicates that two or more carriers are included in the carrier group, the MCI IE may further include a reference carrier index field indicating the index of a reference carrier that has been adjusted to the frequency raster and a configuration type field indicating the carrier configuration type of the carrier group.

Here, when the configuration type field is set to '0', the MCI IE further includes a bandwidth field indicating the bandwidth of the corresponding component carrier since the carrier group consists of carriers having the same size of bandwidth. In addition, when the configuration type field is set to '1', the MCI IE may further include a configuration bitmap field indicating the bandwidth of each component carrier in the form of a bitmap since the carrier group consists of carriers having different sizes of bandwidths.

Table 6 describes an MCI IE which can cover all possible combinations of up to 16 carriers using 6 to 41 bits. In the case in which each carrier group consists of component carriers having the same bandwidth, it is possible to indicate system information of the carriers using 11 bits. In the case in which up to 8 carriers are combined, it is possible to indicate information items of the corresponding carrier aggregation using up to 23 bits.

Referring back to FIG. 5, the AMS may adjust the center frequency of carriers allocated to the AMS by receiving one of the MAC control messages described in Tables 3 to 5 from the ABS (S540).

Figure 6:
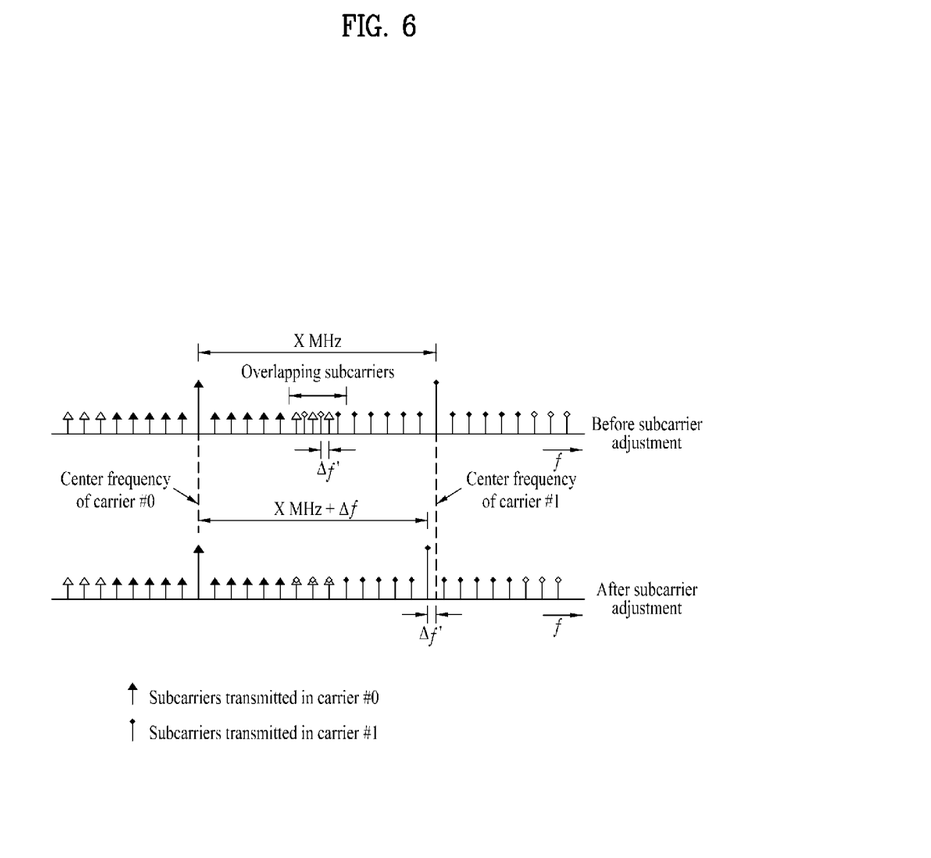
FIG. 6 illustrates a method for adjusting a center frequency by an AMS in step S540 of FIG. 5.

FIG. 6 illustrates a method for adjusting the center frequency by the AMS in step S540 of FIG. 5.

In the case in which neighbor carriers are consecutively allocated, the positions of subcarriers belonging to neighbor carriers in the IEEE 802.16m system or the 3GPP LTE system have not been adjusted. Accordingly, the subcarriers may serve as interference signals in carrier edge portions.

If the relative positions of the subcarriers at carrier edge portions are adjusted to a multiple of the subcarrier spacing, the ABS may transmit signals by performing the same IFFT. This prevents the occurrence of interference between the signals. Since interference is absent, subcarriers that are present in the guard band may also be used to transmit data in the case in which the AMS has the capabilities to receive the total combined bandwidth. Therefore, in the case in which one or more combined carriers are used, it is preferable to adjust the positions of subcarriers at carrier edge portions.

In FIG. 6, subcarriers transmitted in a 1st carrier (carrier #0) are shown as triangles and subcarriers transmitted in a 2nd carrier (carrier #1) are shown as rectangles. An upper part of FIG. 6 shows subcarriers before they are adjusted and a lower part of FIG. 6 shows subcarriers after they are adjusted.

The AMS may adjust the center frequency using the MCI field and the center frequency shift parameter acquired in step S530. The AMS may acquire attribute information items associated with component carriers allocated to the AMS through the MCI field and may determine whether or not to adjust the center frequency through the center frequency shift parameter (or the reference carrier indicator field).

In a procedure in which the AMS enters the network, the ABS may inform the AMS of a frequency offset $\Delta f_c$, which is to be applied to each carrier for subcarrier adjustment, through a multicarrier advertisement (AAI_MC-ADV) message. The AMS may determine the center frequency of each possible carrier according to the MCI and PCI (see Table 3) received in step S530.

The frequency offset may be calculated using the following Expression 1.

$$\Delta f_c = \begin{cases} |f_c' - f_{c,r}| \bmod \Delta f, & \text{if } 0.5\Delta f \geq |f_c' - f_{c,r}| \bmod \Delta f \\ -\Delta f + (|f_c' - f_{c,r}| \bmod \Delta f), & \text{if } 0.5\Delta f < |f_c' - f_{c,r}| \bmod \Delta f \end{cases}$$

Expression 1

In Expression 1, $f_c'$ denotes the center frequency before the frequency offset $\Delta f_c$ is applied and $f_{c,r}$ denotes the center frequency of the reference carrier of each carrier group. In addition, $\Delta f$ denotes a subcarrier spacing of an OFDMA signal. It is preferable that the center frequency of the reference carrier of each carrier group be located on the channel raster grid.

The adjusted center frequency may be calculated through the following Expression 2.

$$f_c = \begin{cases} f_c' - \Delta f_c & \text{if } f_c' \geq f_{c,r} \\ f_c' + \Delta f_c & \text{if } f_c' < f_{c,r} \end{cases}$$

Expression 2

Here, the frequency offset $\Delta f_c$ needs to be less than the subcarrier spacing value $\Delta f$ (i.e., the interval between each subcarrier) shown in FIG. 6.

The AMS may adjust each center frequency by adjusting subcarriers of carriers allocated to the AMS using the MCI field (or MCI IE) and the center frequency shift parameter acquired through the MAC control message received in step S530.

Figure 7:
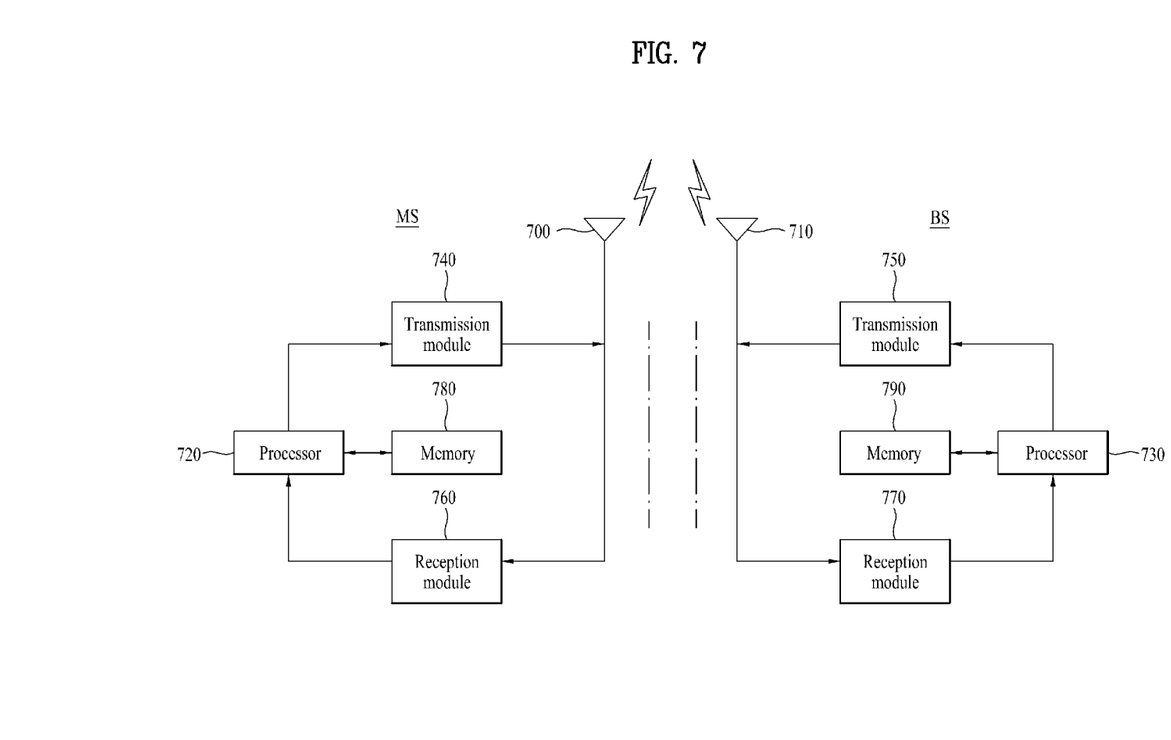
FIG. 7 illustrates an MS and a BS according to another embodiment of the present invention, in which the embodiments of the present invention described with reference to FIGS. 1 to 6 can be implemented.

FIG. 7 illustrates an MS and a BS according to another embodiment of the present invention, in which the embodiments of the present invention described above with reference to FIGS. 1 to 6 can be implemented.

The MS may operate as a transmitter in uplink and may operate as a receiver in downlink. In addition, the ABS may operate as a receiver in uplink and may operate as a transmitter in downlink.

Specifically, the MS and the BS may include transmission modules (Tx modules) 740 and 750 and reception modules (Rx modules) 760 and 770 to control transmission and reception of information, data, and/or messages, respectively, and may also include antennas 700 and 710 to transmit and receive information, data, and/or messages, respectively.

The MS and the BS may further include processors 720 and 730 to perform the embodiments of the present invention described above and memories 780 and 790 which can temporarily or persistently store processes performed by the processors, respectively. Here, each of the processors 720 and 730 may include a Radio Frequency (RF)/Intermediate Frequency (IF) module. Each of the processors may include a MAC module which is a logical entity. That is, the processors of the MS and the BS may control the MAC modules to support carrier combination (i.e., carrier aggregation).

The transmission and reception modules included in each of the MS and the BS may perform, for data transmission, a packet modulation/demodulation function, a fast packet channel coding function, an Orthogonal Frequency Division Multiple Access (OFDMA) packet scheduling function, an FDD/TDD packet scheduling function, and/or a channel multiplexing function.

The apparatuses described above with reference to FIG. 7 are means for implementing the methods described above with reference to FIGS. 1 to 6. The embodiments of the present invention can be implemented using the components and functions of the MS and BS apparatuses described above.

The processor of the BS may inform the MS of information regarding carriers managed by the BS and information regarding carriers provided to the network. For example, when the MS has entered a cell coverage of the BS, the BS may deliver multicarrier-related system information (for example, an MCI, a PCI, a CFS, and the like) to the MS using a MAC control message.

The MS may acquire information regarding carriers allocated to the MS using the methods described above with reference to FIGS. 2 to 5. In addition, the processor of the MS may adjust the center frequency of each carrier using an MCI field (or an MCI IE) and a center frequency shift parameter (or a reference frequency indicator) as described above with reference to FIG. 6.

A Personal Digital Assistant (PDA), a cellular phone, a Personal Communication Service (PCS) phone, a Global System for Mobile (GSM) phone, a Wideband CDMA (WCDMA) phone, a Mobile Broadband System (MBS) phone, a handheld PC, a notebook computer, a smartphone, or a MultiMode-MultiBand (MM-MB) terminal may be used as the mobile terminal in the present invention.

Here, the term "smartphone" refers to a terminal which combines advantageous features of a mobile communication terminal and a PDA, specifically, a terminal constructed by incorporating functions of a PDA, such as a scheduling function, a facsimile transmission and reception function, and a data communication function including an Internet connection function, into a mobile communication terminal. The term "MM-MB terminal" refers to a terminal that includes a multi-modem chip such that it can operate in all communication systems such as a portable internet system and other mobile communication systems (for example, a Code Division Multiple Access (CDMA) 2000 system, a Wideband CDMA (WCDMA) system, etc.).

The embodiments of the present invention may be implemented by various means. For example, the embodiments of the present invention may be implemented by hardware, firmware, software, or any combination thereof.

In the case in which the present invention is implemented by hardware, the methods according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the case in which the present invention is implemented by firmware or software, the methods according to the embodiments of the present invention may be implemented in the form of modules, processes, functions, or the like which perform the features or operations described below. For example, software code can be stored in a memory unit 780 or 790 so as to be executed by a processor 720 or 730. The memory unit may be located inside or outside the processor and can communicate data with the processor through a variety of known means.

The present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention. In addition, claims which are not explicitly dependent on each other can be combined to provide an embodiment or new claims can be added through amendment after this application is filed.

INDUSTRIAL APPLICABILITY

The embodiments of the present invention may be applied to various wireless access systems. Examples of the wireless access systems include 3rd Generation Partnership Project (3GPP), 3GPP2, and/or Institute of Electrical and Electronic Engineers 802 (IEEE 802.xx). The embodiments of the present invention may be applied not only to the various wireless access systems but also to all technical fields to which the various wireless access systems are applied.

The invention claimed is:

1. A method for adjusting a frequency by a mobile station in a wireless access system, the method comprising:
   receiving, by the mobile station, a control message from a base station, the control message including:
      a first parameter indicating a configuration of a carrier group,
      a second parameter indicating whether or not a center frequency has been adjusted, and
      a physical carrier index indicating an index of each physical carrier of the carrier group;
   obtaining, by the mobile station, a center frequency of a carrier allocated to a mobile station using the first parameter and the physical carrier index; and
   adjusting, by the mobile station, the center frequency of the carrier using the second parameter.

2. The method according to claim 1, wherein the first parameter is a multicarrier configuration index indicating at least one of a total bandwidth of the carrier group, the number of component carriers included in the carrier group, and the order of allocation of the component carriers.

3. The method according to claim 1, wherein the second parameter is a center frequency shift parameter indicating whether or not the center frequency is to be shifted from a channel raster grid.

4. The method according to claim 1, wherein the second parameter is a reference carrier indicator indicating whether or not the allocated carrier is a reference carrier.

5. The method according to claim 1, wherein the control message is a global carrier configuration message or a neighbor base station advertisement message.

6. A mobile station configured to adjust a frequency in a wireless access system, the mobile station comprising:
   a transmitter;
   a receiver; and
   a processor operatively connected to the transmitter and the receiver, the processor configured to:
      receive a control message from a base station, the control message including:
         a first parameter indicating a configuration of a carrier group, and
         a second parameter indicating whether or not a center frequency has been adjusted, and
         a physical carrier index indicating an index of each physical carrier of the carrier group;
      obtain a center frequency of a carrier allocated to the mobile station using the first parameter and the physical carrier index; and
      adjust the center frequency of the carrier using the second parameter.

7. The mobile station according to claim 6, wherein the first parameter is a multicarrier configuration index indicating at least one of a total bandwidth of the carrier group, the number of component carriers included in the carrier group, and the order of allocation of the component carriers.

8. The mobile station according to claim 6, wherein the second parameter is a center frequency shift parameter indicating whether or not the center frequency is to be shifted from a channel raster grid.

9. The mobile station according to claim 6, wherein the second parameter is a reference carrier indicator indicating whether or not the allocated carrier is a reference carrier.

10. The mobile station according to claim 6, wherein the control message is a global carrier configuration message or a neighbor base station advertisement message.

* * * * *